(12) United States Patent
Maltseff et al.

(10) Patent No.: US 7,978,639 B2
(45) Date of Patent: Jul. 12, 2011

(54) SYSTEMS, METHODS AND DEVICES FOR COLLECTING DATA FROM WIRELESS SENSOR NODES

(75) Inventors: Paul A. Maltseff, Edmonds, WA (US); Steven Winter, Stanwood, WA (US)

(73) Assignee: Intermec IP Corp., Everett, WA (US)

( * ) Notice: Subject to any disclaimer, the term of this patent is extended or adjusted under 35 U.S.C. 154(b) by 928 days.

(21) Appl. No.: 11/848,033

(22) Filed: Aug. 30, 2007

(65) Prior Publication Data

US 2009/0058634 A1 Mar. 5, 2009

(51) Int. Cl.
H04H 20/71 (2008.01)
(52) U.S. Cl. .................................. 370/312; 370/328
(58) Field of Classification Search .................. 370/312, 370/328, 338, 401, 278
See application file for complete search history.

(56) References Cited

U.S. PATENT DOCUMENTS

| | | | |
|---|---|---|---|
| 6,418,526 B1 | 7/2002 | Denman et al. | |
| 7,034,660 B2 | 4/2006 | Watters et al. | |
| 7,436,789 B2 | 10/2008 | Caliskan et al. | |
| 7,483,403 B2 | 1/2009 | Herrmann et al. | |
| 7,697,458 B2 | 4/2010 | Park et al. | |
| 7,729,285 B2 | 6/2010 | Yoon | |
| 2003/0152041 A1 | 8/2003 | Herrmann et al. | |
| 2008/0068156 A1* | 3/2008 | Shimokawa et al. | 340/539.22 |
| 2008/0137624 A1 | 6/2008 | Silverstrim et al. | |
| 2009/0019056 A1* | 1/2009 | Othman et al. | 707/10 |

OTHER PUBLICATIONS

Dressler, F., et al., "Self-Organization in Ad Hoc Networks: Overview and Classification," University of Erlangen, Dept. of Computer Science 7, Technical Report, Feb. 2006, pp. 1-12.
Dulman, S., et al., "Wave Leader Election Protocol For Wireless Sensor Networks," MMSA Workshop, Dec. 2002, 8 pages.
Gan, L., et al., "Agent-Based, Energy Efficient Routing in Sensor Networks," AAMAS '04, Jul. 19-23, 2004, 8 pages.
Heinzelman, W. et al., "Energy-Efficient Communication Protocol for Wireless Microsensor Networks," Proceedings of the 33rd Hawaii International Conference on System Sciences, 2000, pp. 1-10.
Raghunathan, V., et al. "Energy-Aware Wireless Microsensor Networks," IEEE Signal Processing Magazine, Mar. 2002, pp. 40-50.
"Systems, Methods and Devices that Dynamically Establish a Sensor Network," U.S. Appl. No. 11/848,121, filed Aug. 30, 2007.
Maltseff et al., "Systems, Methods, and Devices that Dynamically Establish a Sensor Network," Office Action mailed Aug. 5, 2010, for U.S. Appl. No. 11/848,121, 7 pages.

* cited by examiner

*Primary Examiner* — Huy D Vu
*Assistant Examiner* — Dady Chery
(74) *Attorney, Agent, or Firm* — Seed IP Law Group PLLC

(57) ABSTRACT

A data request from a requesting device is received at a network of wireless sensor nodes. The data request is then forwarded through the network of wireless sensor nodes to a source wireless sensor node, where data responsive to the data request is generated. A reply including the responsive data is then forwarded along at least two communication paths through the network of wireless sensor nodes back to the requesting device.

19 Claims, 10 Drawing Sheets

SYSTEMS, METHODS AND DEVICES FOR COLLECTING DATA FROM WIRELESS SENSOR NODES

BACKGROUND OF THE INVENTION

1. Technical Field

This description generally relates to the field of wireless sensor networks, and more particularly to collecting data from wireless sensor nodes.

2. Description of the Related Art

Networks built from small nodes with sensing and wireless communications capabilities may be used to collect data in a variety of environments. Each wireless sensor node is typically an autonomous device that detects or monitors environmental characteristics of its surrounding environment. These wireless sensor nodes may then organize themselves flexibly and autonomously (i.e., without direct central control) into a network for data collection and delivery.

Such networks may be used in the performance of a number of tasks, including monitoring manufacturing facilities, infrastructure or construction sites, tracking documents, detecting changing weather conditions or early warning signs for natural disasters, etc. The wireless sensor nodes may be positioned at precise locations or scattered randomly throughout the monitored environments to detect characteristics including: temperature, density, strain, deformation, acceleration, pressure, opacity, concentration, chemical state, resistance, phase changes, humidity, etc. The wireless sensor nodes may be periodically or continuously queried to obtain information regarding past or current environmental characteristics.

The above-described networks typically do not rely on every wireless sensor node functioning perfectly. Indeed, even persistent communication between particular wireless sensor nodes within the network is not assumed. Each individual wireless sensor node may be relatively low-powered and may have relatively limited functionality and intelligence.

The individual wireless sensor nodes may range from "macro-sized" wireless sensor nodes, from the size of backpacks to roughly the size of a coin, to "micro-sized" sensor nodes, that can be the size of dust particles. These wireless sensor nodes may communicate wirelessly in a number of ways, but most commonly communicate via electromagnetic radiation (e.g., radio or microwave wavelengths).

In one implementation, each wireless sensor node may include a radio frequency identification ("RFID") transponder commonly referred to as an RFID tag. Such RFID tags typically employ an antenna coupled to a wireless transponder circuit to transmit and/or receive data via electromagnetic signals in some frequency range.

The wireless transponder circuit found in many RFID tags typically includes a memory portion and a logic portion. The memory portion stores data, while the logic portion controls the reading, writing, and manipulating of data in the memory portion. The logic portion may further couple between the memory portion and the antenna to act as a transmitter, receiver, or transceiver for reading and/or writing data to and/or from the RFID tags.

Active wireless sensor nodes may include a discrete consumable power source, such as a battery, to provide power to the wireless transponder circuit and the sensor. In contrast, passive wireless sensor nodes may derive power from a wireless interrogation signal, for example, by backscattering the signal as a response signal encoded with information from the wireless sensor node.

BRIEF SUMMARY

In one embodiment, a method for collecting data from a network of wireless sensor nodes comprises: directly transmitting a data request to a first wireless sensor node and a second wireless sensor node; receiving a first reply including data responsive to the data request via the first wireless sensor node and a second reply including data responsive to the data request via the second wireless sensor node, the responsive data in the first reply and the responsive data in the second reply having been generated at a third wireless sensor node; and filtering the first reply and the second reply based at least in part on an identifier associated with the third wireless sensor node.

In another embodiment, a system for collecting data from a network of wireless sensor nodes comprises a wireless mobile computing device and a source wireless sensor node. The wireless mobile computing device may include a mobile device processor that executes instructions; and a mobile device memory that stores instructions that cause the mobile device processor to: transmit a data request; and receive at least one reply including data responsive to the transmitted data request. The source wireless sensor node may include a sensor that detects environmental characteristics; a sensor node processor that executes instructions; and a sensor node memory that stores instructions that cause the sensor node processor to: receive a plurality of forwarded data requests corresponding to the transmitted data request from a plurality of wireless sensor nodes; generate the responsive data based at least in part on the detected environmental characteristics; and transmit a plurality of replies including the responsive data to at least some of the plurality of wireless sensor nodes.

In yet another embodiment, a method for collecting data from a network of wireless sensor nodes comprises: receiving a data request from a requesting device at a network of wireless sensor nodes; forwarding the data request through the network of wireless sensor nodes to a source wireless sensor node; generating data responsive to the data request at the source wireless sensor node; and forwarding a reply including the responsive data along at least two communication paths through the network of wireless sensor nodes to the requesting device.

In another embodiment, a wireless sensor node for collecting and transmitting data in a network of wireless sensor nodes may comprise a sensor that detects environmental characteristics; a processor that executes instructions; and a memory that stores instructions. The instructions stored on the memory may cause the processor to: receive a plurality of data requests from a plurality of wireless sensor nodes, the plurality of data requests corresponding to one original data request from a requesting device; determine whether the processor can generate data responsive to the original data request based at least in part on the detected environmental characteristics; determine a plurality of hop counts, each hop count corresponding to a number of direct transmissions in a communication path between the wireless sensor node and the requesting device including at least one of the plurality of wireless sensor nodes; and transmit a plurality of replies to at least some of the plurality of wireless sensor nodes based at least in part on the determined plurality of hop counts.

In yet another embodiment, a wireless mobile computing device for collecting data from a network of wireless sensor nodes may comprise a processor that executes instructions; and a memory that stores instructions that cause the processor to: directly transmit a data request to a first wireless sensor node; receive a first reply including data responsive to the data request and a second reply including data responsive to the data request, the responsive data in the first reply and the responsive data in the second reply having been generated at a second wireless sensor node; and filter the first reply and the second reply based on an identifier associated with the second wireless sensor node.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF EMBODIMENTS OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wireless sensor nodes, mobile devices, integrated circuits, antennas, radio frequency transmitters and receivers, networks, and wireless communications have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Description of an Exemplary Network of Wireless Sensor Nodes

Figure 1:
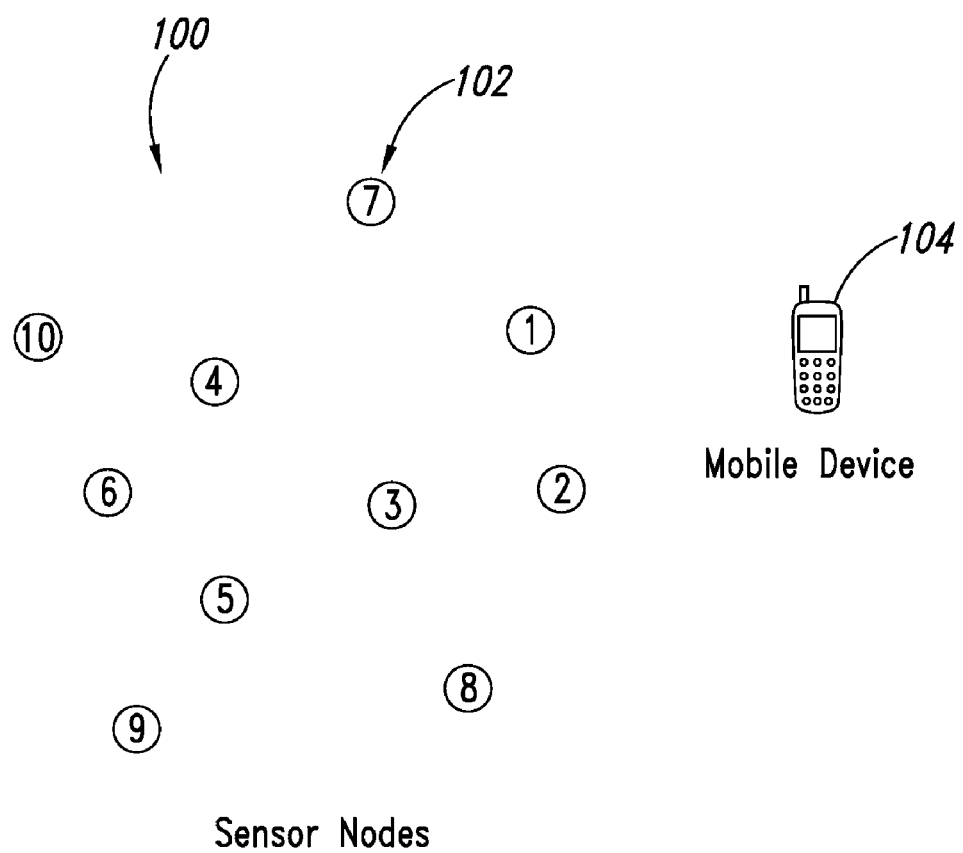
FIG. 1 is a schematic view of a network of wireless sensor nodes and a wireless mobile computing device, according to one illustrated embodiment.

FIG. 1 shows a network 100 of wireless sensor nodes 102 (only one of which is called out in FIG. 1). Each of the wireless sensor nodes 102 is numbered from 1 to 10 for ease of reference. It may be understood, however, that the illustrated numbering does not correspond to any particular identifier or method of identifying any of the illustrated wireless sensor nodes 102. A wireless mobile computing device 104 is also illustrated adjacent the network 100.

As discussed above, the network 100 of wireless sensor nodes 102 may comprise any number of homogenous or heterogeneous wireless sensor nodes 102. Each wireless sensor node 102 may be configured to detect a particular environmental characteristic or characteristics. For example, some of the wireless sensor nodes 102 may detect electromagnetic energy. In another example, certain of the wireless sensor nodes 102 may detect temperature, and may include a digital or analog thermometer from which readings may be taken periodically, continuously, or upon request. In yet another example, certain of the wireless sensor nodes 102 may detect humidity, and may include a digital or analog barometer from which readings may be taken periodically, continuously, or upon request. The network 100 of wireless sensor nodes 102 may include any of a variety of sensors, including acoustic sensors, chemical or biological sensors, stress sensors, hardness sensors, pressure sensors, mass sensors, acceleration sensors, resistance sensors, pH sensors, power sensors, etc.

In one embodiment, the network 100 is homogenous, including a vast array of wireless sensor nodes configured to detect the same environmental characteristics (albeit in their individual environment). In another embodiment, the wireless sensor nodes 102 may be heterogeneous (e.g., wireless sensor node 1 may include a temperature sensor, while wireless sensor node 2 may include a humidity sensor). In still other embodiments, each wireless sensor node 102 may include a plurality of sensors to detect a plurality of different environmental characteristics.

The wireless sensor nodes 102 may each include a wireless interface through which they can communicate with each other and other wireless devices via electromagnetic signals. For example, each wireless sensor node 102 may include a wireless transponder circuit configured to exchange wireless signals with other wireless transponder circuits. In one embodiment, the wireless transponder circuit may be a RFID circuit and may operate over a range of frequencies, such as 860-930 MHz, 2.45 GHz, or 5.8 GHz. In other embodiments, the wireless interface may include other structures for communicating wirelessly with other wireless sensor nodes.

In one embodiment, the wireless sensor nodes 102 may comprise active RFID circuits having a discrete, consumable power source, such as a battery. The wireless sensor nodes 102 may rely upon this discrete power source to power both the sensors described above as well as the wireless sensor nodes' internal circuitry. The wireless sensor nodes 102 may also include structures for autonomously scavenging power from their environment. For example, the wireless sensor nodes 102 may include solar cells and/or piezoelectric elements for transforming the energy in sunlight, vibratory forces, soundwaves, etc. into useful electrical current. Of course, passive RFID circuitry may be used in other embodiments depending on the requirements for the network 100. In one embodiment, if passive RFID circuitry is used, such passive wireless sensor nodes may be interspersed with active wireless sensor nodes that can provide local interrogation signals for the passive RFID circuitry.

Regardless of the power source, the wireless sensor nodes 102 may be relatively low-powered (as they may be both small and wireless). In addition, the wireless sensor nodes 102 may be removed, replaced, or put out of commission without warning. Thus, the network 100 of wireless sensor nodes 102 may be relatively flexible, allowing for the presence or absence of wireless sensor nodes at any point along the network 100 without disrupting communications throughout the network 100.

The wireless sensor nodes 102 of the network 100 may be distributed in any of a variety of ways. In one embodiment, the wireless sensor nodes 102 may be distributed randomly or pseudo-randomly. For example, in a manufacturing facility, a large number of micro-sized wireless sensor nodes may be haphazardly strewn about the floor of the facility in order to create a network of wireless sensor nodes. In another example, a number of macro-sized wireless sensor nodes may be air-dropped about a forest in order to create a network of wireless sensor nodes for detecting and monitoring forest fires. In another embodiment, the distribution of wireless sensor nodes 102 may be deterministic, and there may be greater physical network organization. For example, a plurality of wireless sensor nodes may be embedded in a roadway at a given distance from each other in order to monitor stresses, chemical composition, vibration or other environmental characteristics of the roadway or bridge. Other geometric patterns may also be employed in the distribution of the wireless sensor nodes 102.

To facilitate communication between the wireless sensor nodes 102 of the network 100, each wireless sensor node 102 may be associated with an identifier. In one embodiment, the identifier may comprise a numerical identifier stored on the wireless sensor node 102 during manufacturing. For example, a numerical identifier may be stored on read-only memory within the wireless sensor node 102. In another embodiment, the identifier for each wireless sensor node 102 may be variable and may be generated during a network association process. This network association process may be completed once, at the formation of the network 100, and/or may be updated periodically.

In one example, other network association processes may be used, such as that disclosed in co-pending U.S. patent application Ser. No. 11/848,121, filed concurrently, titled "SYSTEMS, METHODS, AND DEVICES THAT DYNAMICALLY ESTABLISH A SENSOR NETWORK," the contents of which are hereby incorporated by reference herein in their entirety.

Located within the boundaries or located at the outskirts of the network 100, a wireless mobile computing device 104 is illustrated for collecting data from the network 100 of wireless sensor nodes 102. As discussed at greater length below, the wireless mobile computing device 104 may have any of a variety of configurations. In one embodiment, the wireless mobile computing device 104 may be configured similarly to an RFID wireless interrogator. In other embodiments, the wireless mobile computing device 104 may be configured similarly to a cell phone, a personal digital assistant, or other handheld wireless device.

The wireless mobile computing device 104 may include a wireless interface through which it can communicate with at least one of the wireless sensor nodes 102 of the network 100 via electromagnetic signals. For example, the wireless mobile computing device 104 may include an RFID circuit and may operate over a range of frequencies, such as 860-930 MHz, 2.45 GHz, or 5.8 GHz, which may correspond to the range of frequencies over which the wireless sensor nodes 102 are also operative. In other embodiments, the wireless interface may include other structures for communicating wirelessly with the wireless sensor nodes 102.

In one embodiment, the wireless mobile computing device 104 may be relatively easily movable with respect to the network 100. For example, the wireless sensor nodes 102 may be positioned (randomly or otherwise) to detect environmental conditions at particular locations throughout the network 100 and may be relatively stationary. Meanwhile, the wireless mobile computing device 104 may be located anywhere throughout the network 100 in order to communicate with at least one of the wireless sensor nodes 102. In another embodiment, the wireless mobile computing device 104 may be a handheld device designed and adapted to be carried about by its user. In yet another embodiment, the wireless mobile computing device 104 may comprise a system located within a vehicle, which may then be driven or guided through the network 100 of wireless sensor nodes 102.

Figure 2A:
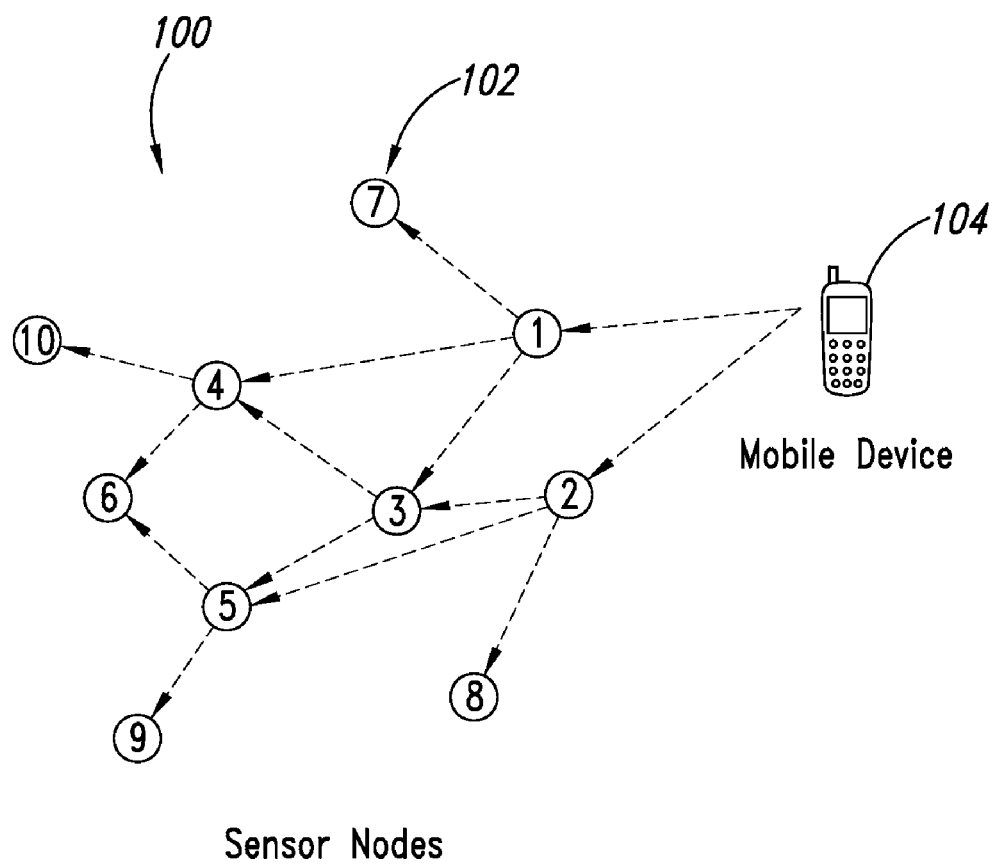
FIG. 2A is a schematic view of the network of wireless sensor nodes of FIG. 1, illustrating a data request from the wireless mobile computing device forwarded through the network of wireless sensor nodes.

As is schematically illustrated in FIG. 2A by the dashed lines between the wireless mobile computing device 104 and the wireless sensor nodes 102 of the network 100, the wireless mobile computing device 104 may directly transmit a data request to the network 100 of wireless sensor nodes 102. For example, as illustrated, the wireless mobile computing device 104 may directly transmit a data request to wireless sensor node 1 and wireless sensor node 2. In this context, "directly" transmitting or receiving a message may be understood to mean that no intervening devices or nodes are intercepting and forwarding the message between the wireless mobile computing device 104 and one or more of the wireless sensor nodes 102.

In one embodiment, the wireless mobile computing device 104 transmits the data request as an electromagnetic signal that may be received and processed at the wireless sensor nodes 1 and 2. The electromagnetic signal may be relatively unfocused, so that a single data request may be sent to multiple wireless sensor nodes 102 in the same transmission. In one embodiment, the wireless mobile computing device 104 is not aware of which wireless sensor nodes 102 are adjacent the wireless mobile computing device 104, and the data request may not be formatted to specify particular wireless sensor nodes 102 as recipients. In other embodiments, of course, the wireless mobile computing device 104 may communicate with the network 100 by other means.

The data requested from the network 100 of wireless sensor nodes 102 may, in one embodiment, include data associated with any of the environmental characteristics accessed or accessible by any of the wireless sensor nodes 102 (not just the wireless sensor nodes 102 directly communicative with the wireless mobile computing device 104). Such data may include, for example, temperature values, humidity values, identifiers of wireless sensor nodes 102 having sensors for detecting particular environmental characteristics, chemical composition values, identifiers of wireless sensor nodes 102 that have been exposed to a particular environmental characteristic, stress values, etc. Other data may also be requested from the network 100. For example, in one embodiment, the wireless mobile computing device 104 may request identifiers for all operating wireless sensor nodes 102. In another embodiment, the wireless mobile computing device may request battery life information for all or a portion of the network 100 of wireless sensor nodes 102.

In the illustrated embodiment, the data request (along with some other information/data in certain embodiments, as discussed below) may then be forwarded by the wireless sensor nodes 1 and 2, to other wireless sensor nodes 102 with which the wireless sensor nodes 1 and 2 directly communicate. For example, as illustrated, wireless sensor node 1 may forward the data request to wireless sensor nodes 3, 4 and 7, and wireless sensor node 2 may forward the data request to wireless sensor nodes 3, 5 and 8. Thus, wireless sensor nodes 1 and 2 may forward the data request received from the wireless mobile computing device 104 to five other wireless sensor nodes 102. These wireless sensor nodes 102 may, in turn, forward the data request to wireless sensor nodes 102 with which they are in direct communication, and so on. In this way, the data request passes through the network 100 along a number of communication paths.

In one embodiment, a communication path may be defined as a sequence of nodes between an originating node and a destination node (the wireless mobile computing device 104 also defining a node for these purposes) through which a message, piece of data, or request may be sent. For example, as illustrated in FIG. 2A, four communication paths are illustrated between the wireless mobile computing device 104 and the wireless sensor node 6. Referring to the wireless mobile computing device 104 as node 0, and using a notation wherein the sequence of nodes defining a communication path is written as a sequence of comma-separated numbers, the communication paths between the wireless mobile computing device 104 and the wireless sensor node 6 include: (0, 1, 4, 6); (0, 1, 3, 4, 6); (0, 2, 5, 6); and (0, 2, 3, 5, 6). Of course, in other embodiments, many more or fewer communication paths may be defined or may possibly be defined between the wireless mobile computing device 104 and any particular wireless sensor node 102.

The number of direct transmissions defining a particular communication path may be referred to as the hop count. For example, the communication path (0, 1, 4, 6) between the wireless mobile computing device 104 and the wireless sensor node 6 has a hop count of three (illustrated as three dashed lines connecting the four nodes). The communication path (0, 1, 3, 4, 6) between the wireless mobile computing device 104 and the wireless sensor node 6 has a hop count of four.

In one embodiment, as a data request is forwarded through the network 100 of wireless sensor nodes 102, each wireless sensor node 102 may append data representative of a minimum hop count between it and the wireless mobile computing device 104 initiating the data request. Turning back to FIG. 2A, wireless sensor node 1 may forward the data request to wireless sensor nodes 3, 4 and 7 along with data representative of its minimum hop count of one. Wireless sensor device 3 may then forward the data request received from wireless sensor node 1 to wireless sensor nodes 4 and 5 along with data representative of its minimum hop count of two. As a result, wireless sensor node 4 may receive two forwarded data requests, one from wireless sensor node 1, the other from wireless sensor node 3. Each of these data requests is associated with different hop counts. Wireless sensor node 4 may then compare these hop counts in order to determine that the communication path with the minimum hop count (two) between wireless sensor node 4 and the wireless mobile computing device 104 is through wireless sensor node 1. The wireless sensor node 4 may then forward the data request to wireless sensor node 6 along with data representative of its minimum hop count of two.

Each wireless sensor node 102 that receives the data request may process it to determine whether or not the wireless sensor node 102 has access to data responsive to the data request. For example, the data request may specify a request for all locations where the current temperature exceeds 70° F. Certain wireless sensor nodes 102 may not include temperature sensors and would therefore forward the data request on to adjacent wireless sensor nodes 102 without generating responsive data. Other wireless sensor nodes 102 may include temperature sensors but may not be in a location where the current temperature exceeds 70° F. These wireless sensor nodes 102 might also forward the data request without generating responsive data.

In one embodiment, the data request triggers each wireless sensor node 102 that might have access to responsive data to determine a current status of an associated sensor. In another embodiment, the data request may trigger each wireless sensor node 102 to check a memory or cache of the wireless sensor node 102 to find data responsive to the data request.

Figure 2B:
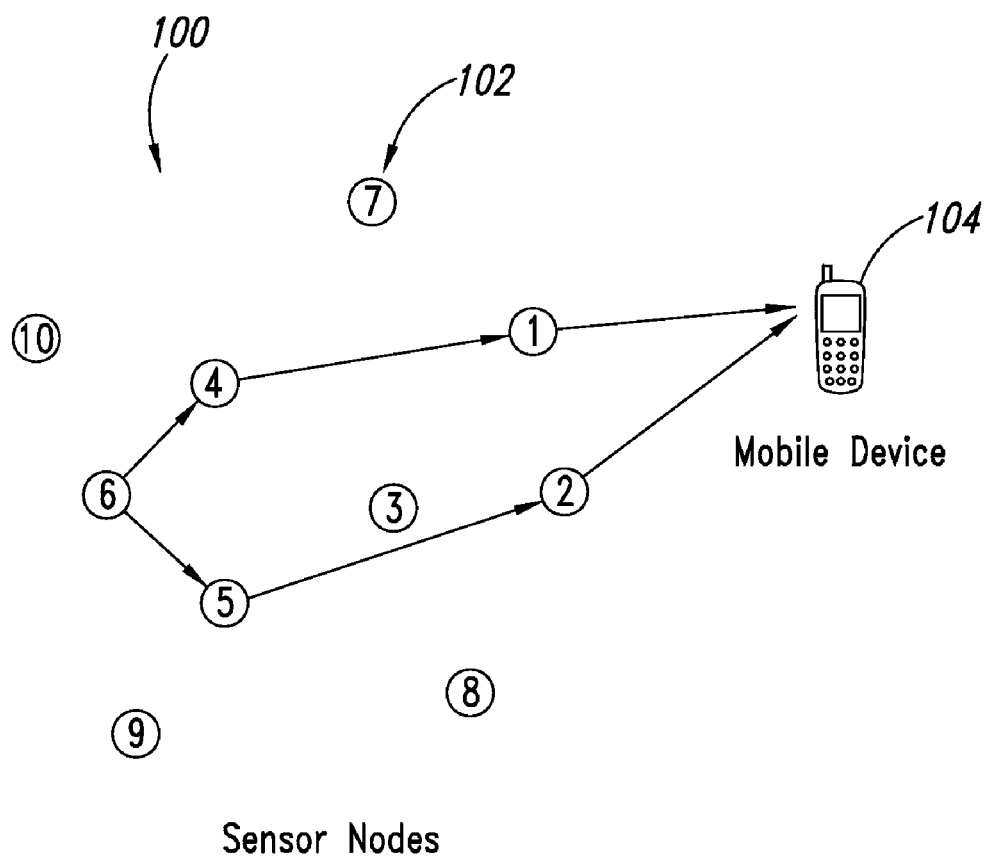
FIG. 2B is a schematic view of the network of wireless sensor nodes of the FIG. 1, illustrating a reply from a source wireless sensor node forwarded through the network of wireless sensor nodes.

If the wireless sensor node 102 determines that it does indeed have access to data responsive to the data request, the wireless sensor node 102 may generate or access the responsive data and transmit at least one reply including the responsive data back through the network 100 to the wireless mobile computing device 104. This reply process is illustrated in FIG. 2B.

As illustrated, wireless sensor node 6 may serve as a source wireless sensor node, generating a plurality of replies to the received data requests. In one embodiment, wireless sensor node 6 may determine a hop count associated with each of the adjacent wireless sensor nodes from which it received a forwarded data request. The wireless sensor node 6 may then transmit replies to the adjacent wireless sensor nodes having a minimum hop count value. In the illustrated example, both adjacent wireless sensor nodes 4 and 5 have minimum hop counts of two along respective communication paths to the wireless mobile computing device 104. As a result, wireless sensor node 6 may transmit two replies along these two communication paths.

Wireless sensor node 4 and wireless sensor node 5 may each forward the reply along their own communication path having a minimum hop count value. For example, wireless sensor node 4 may choose the communication path via wireless sensor node 1.

Of course, in other embodiments, the communication paths taken by the replies from a source wireless sensor node 102 may be chosen in other ways. For example, in one embodiment, the source wireless sensor node and subsequent forwarding nodes may send replies along a plurality of communication paths having low hop count values (even if they do not each have a minimum hop count value). In another embodiment, the source wireless sensor node and subsequent forwarding nodes may send replies along every available communication path.

As illustrated in FIG. 2B, a reply from a source wireless sensor node back to the wireless mobile computing device 104 may traverse a plurality of communication paths. In one embodiment, the plurality of communication paths may help to ensure that the reply arrives at the wireless mobile computing device 104, providing redundancy in a relatively unstable network 100.

Although only one source wireless sensor node is illustrated in FIG. 2B, in other embodiments, a plurality of wireless sensor nodes may include data responsive to a data request. In such embodiments, the wireless mobile computing device 104 may receive replies originating from a number of source wireless sensor nodes 102 having data responsive to the data request. Thus, in one embodiment, each reply may include an identifier associated with the source wireless sensor node for that reply. For example, the two replies sent by wireless sensor node 6 to wireless sensor nodes 4 and 5 may include an identifier associated with wireless sensor node 6. This identifier may then be forwarded as part of the replies to the wireless mobile computing device 104.

In one embodiment, the wireless mobile computing device 104 may include a filtering mechanism (implemented in software, hardware or both) to determine whether or not a plurality of replies are originating from the same source wireless sensor node 102 and to filter among them. This filtering mechanism may employ the above-described identifier to determine whether or not replies are originating from the same source wireless sensor node, or may employ other characteristics of the replies. In one embodiment, the wireless mobile computing device 104 may store data from a first arriving reply and may then discard all subsequent replies originating from the same source wireless sensor node 102.

Figure 3A:
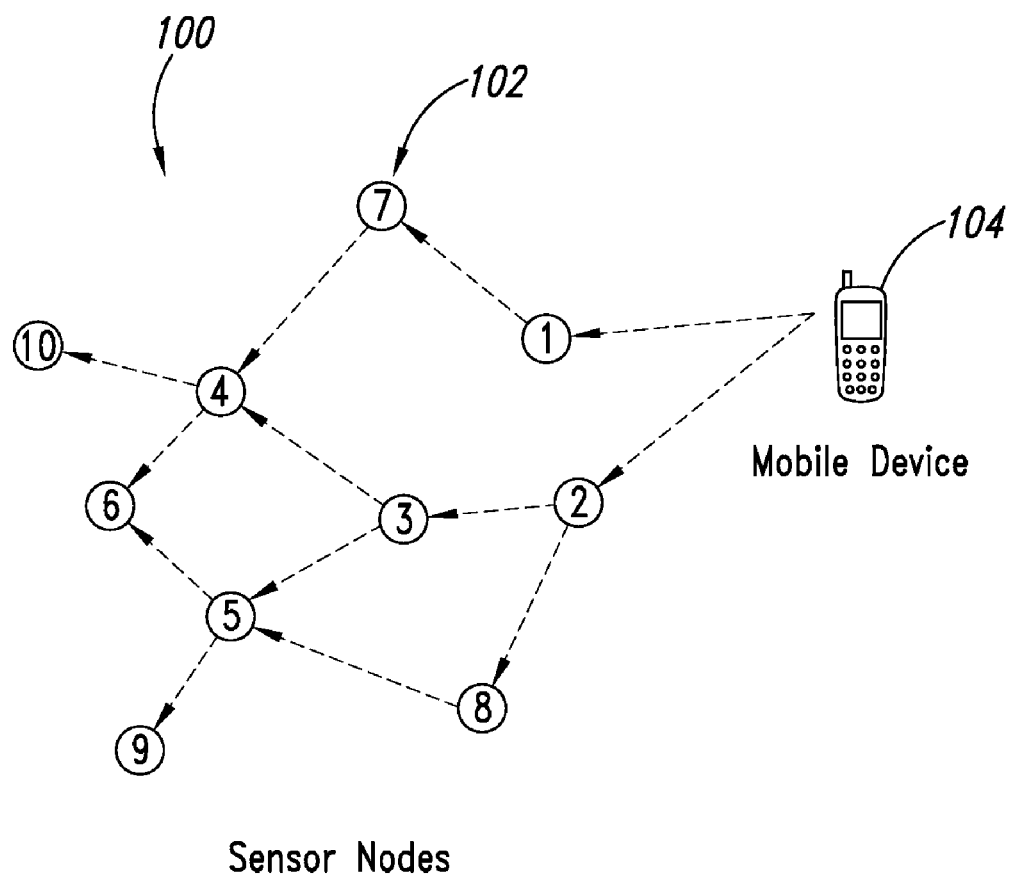
FIG. 3A is a schematic view of the network of wireless sensor nodes of FIG. 1, illustrating another data request from the wireless mobile computing device forwarded through the network of wireless sensor nodes.
Figure 3B:
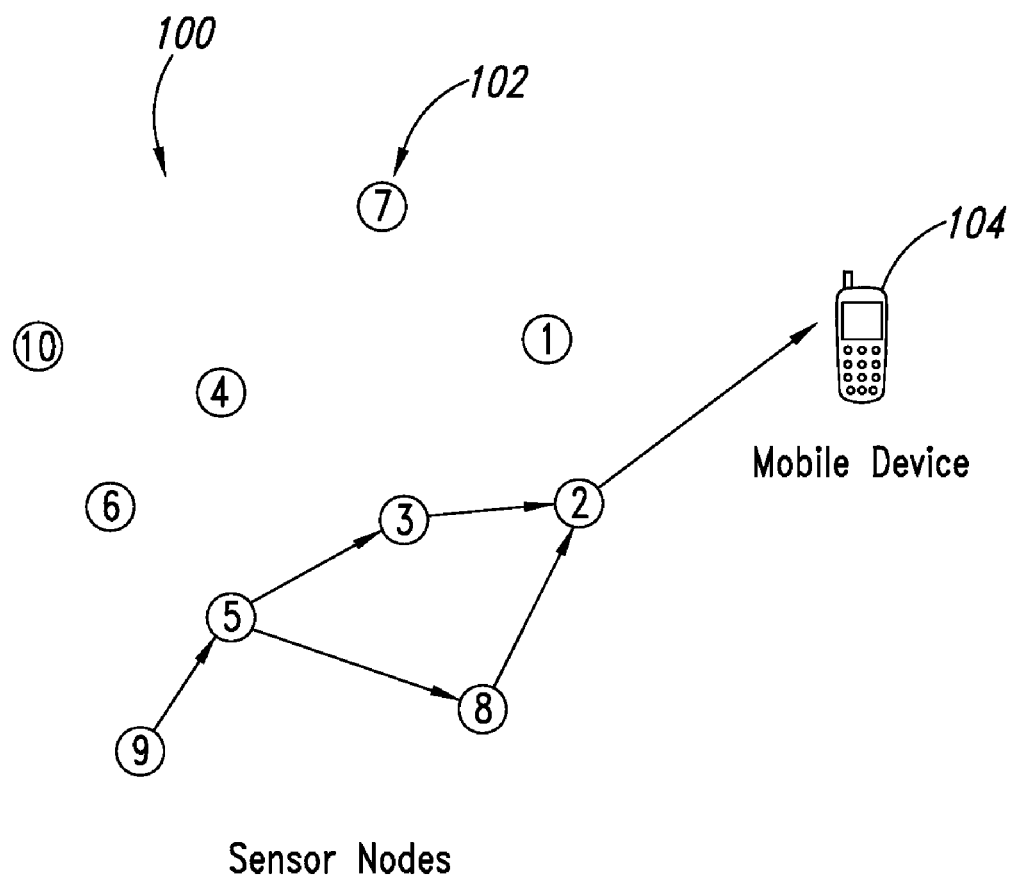
FIG. 3B is a schematic view of the network of wireless sensor nodes of the FIG. 1, illustrating another reply from a source wireless sensor node forwarded through the network of wireless sensor nodes.

FIGS. 3A and 3B illustrate yet another data request and reply being propagated across the network 100, for which the source wireless sensor node is wireless sensor node 9. It may be seen in FIGS. 2A and 3A that different wireless sensor nodes 102 may be able to directly communicate with each other only under certain circumstances (e.g., wireless sensor nodes 1 and 3). This may be due to environmental conditions, physical obstacles between the wireless sensor nodes, varying distances between the wireless sensor nodes, etc.

As illustrated in FIGS. 3A and 3B, wireless sensor node 9 may only send direct communications to wireless sensor node 5. As a result, wireless sensor node 9 may reply to the data request originating with the wireless mobile computing device 104 with a single reply sent to wireless sensor node 5. Wireless sensor node 5, in turn, may be associated with two communication paths to the wireless mobile computing device 104, namely (5, 3, 2, 0) and (5, 8, 2, 0). As shown in FIG. 3B, wireless sensor node 5 may forward the reply from wireless sensor node 9 to both wireless sensor nodes 3 and 8 (which each have a minimum hop count of two). Wireless sensor nodes 3 and 8 may then forward the reply to wireless sensor node 2. In one embodiment, wireless sensor node 2 may include a filtering mechanism to determine whether or not a plurality of replies are originating from the same source wireless sensor node 102, and wireless sensor node 2 may forward only one of those replies on to the wireless mobile computing device 104. In an alternative embodiment, wireless sensor node 2 may not take this extra filtering act and may instead forward all replies on to the wireless mobile computing device 104 (where they may be filtered as described above).

As described above, in one embodiment, the initial data request may be "multicast" through the network 100, with each wireless sensor node 102 forwarding the data request to whichever wireless sensor nodes 102 effectively receive its signal. In contrast, the replies may follow more directed communication paths through the network 100, with each transmission intended for a particular wireless sensor node 102 along a chosen route. The "multicasting" may thus be utilized for those communications where the destination node is unknown, and where it is best to reach as much of the network 100 as possible. In contrast, the more directed replies are able to trace a communication path back to the requesting device without expending energy on the unnecessary transmission and reception of data. To increase the energy savings during the reply process, in one embodiment, each wireless sensor node 102 may be configured to effectively "ignore" replies intended for other wireless sensor nodes 102 (e.g., by using very little power to determine that a transmission is not intended for it and ignoring the rest of the transmission).

Description of an Exemplary Wireless Sensor Node

Figure 4:
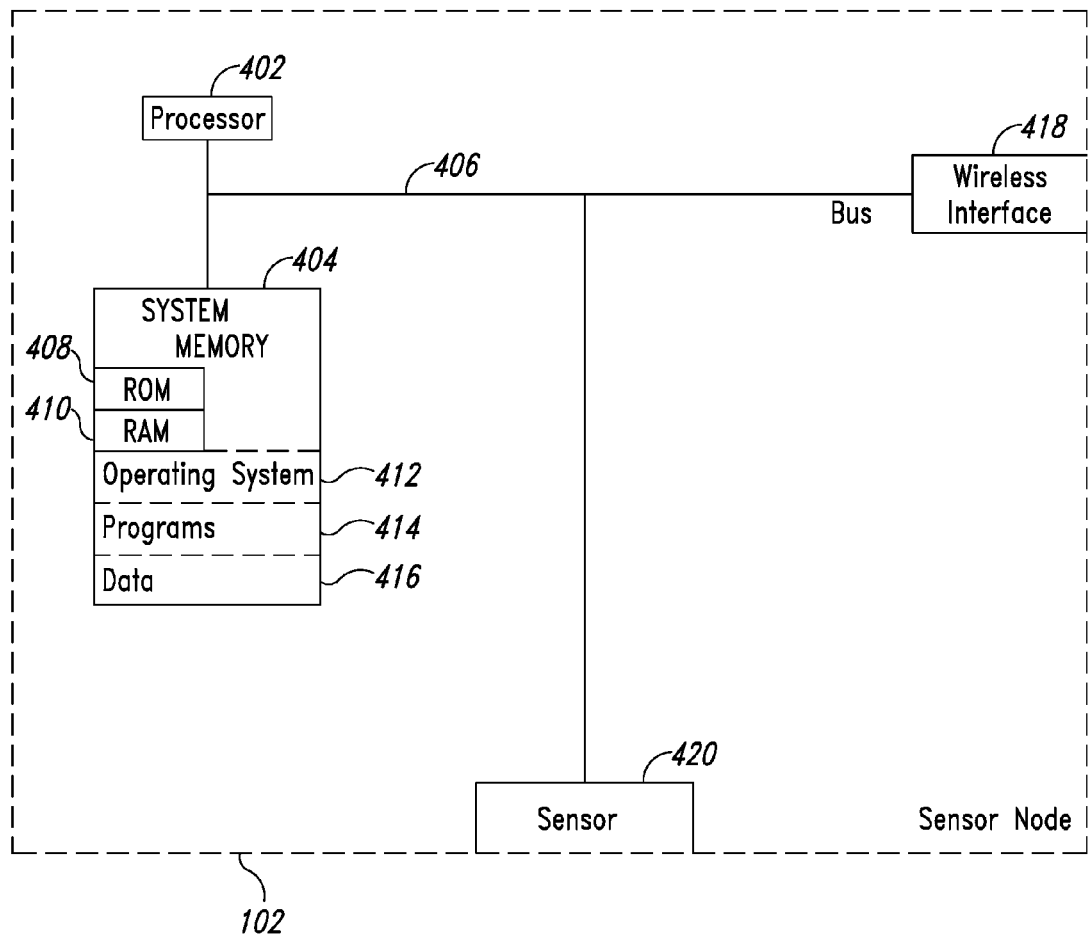
FIG. 4 is a schematic view of a wireless sensor node, according to one illustrated embodiment.

FIG. 4 is a schematic diagram of an exemplary wireless sensor node 102. Although not required, the embodiments will be described in the general context of computer-executable instructions, such as program modules, objects, or macros being executed by a processor. Those skilled in the relevant art will appreciate that the illustrated embodiments as well as other embodiments can be practiced with other wireless sensor configurations, including handheld devices, microprocessor-based or programmable consumer electronics, personal computers ("PCs"), and the like.

The wireless sensor node 102 may include a processor, controller or other logic unit 402, a system memory 404 and a system bus 406 that couples various system components including the system memory 404 to the processor 402.

The processor 402 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 4 are of conventional design. As a result, such blocks need not be described in further detail herein, as they will be understood by those skilled in the relevant art.

The system bus 406 can employ any known bus structures or architectures, including a memory bus with memory controller, a peripheral bus, and a local bus. The system memory 404 may include read-only memory ("ROM") 408 and random access memory ("RAM") 410. The wireless sensor node 102 may also include a more permanent form of memory or other computer-readable media, such as flash memory, hard disk drives, smart cards, etc. (not shown).

Program modules can be stored in the system memory 404, such as an operating system 412, one or more programs 414 and data 416 (program data, sensor data, identifier data, etc.).

The wireless sensor node 102 may operate in a networked environment via a wireless interface 418 to communicate with one or more wireless devices. In one embodiment, the wireless interface 418 may include wireless transponder circuitry for wireless communication. Generally, the wireless transponder circuitry may function to receive and transmit wireless signals. In some embodiments, the wireless transponder circuitry may transmit electromagnetic signals when actuated or probed by a signal from a wireless interrogator. For example, if the wireless sensor node 102 comprises an active RFID device, then the wireless transponder circuitry may facilitate communication in the radio frequency band. In other embodiments, other frequencies may be used by the wireless interface for communication.

A sensor 420 may also be coupled to the bus 406 in the wireless sensor node 102. The sensor 420 may be any suitable sensing device for detecting and/or monitoring environmental characteristics. In one embodiment, the sensor 420 may be chosen to operate on very little power, and in severe environmental conditions. For example, a silicon-based micro-electromechanical system (MEMS) may be employed. MEMS may serve as pressure sensors, accelerometers, strain gauges, etc. By using a MEMS device, the wireless sensor node 102 may achieve robust environmental sensing using very little power.

The operating system 412 and/or the programs 414 of the wireless sensor node 102 may query the sensor 420 at periodic intervals to detect one or more environmental characteristics. Data representative of these environmental characteristics may then be stored in the system memory 416 or in a more robust, long-term memory. In other embodiments, the wireless sensor node 102 may generate data based on detected environmental characteristics upon receiving a data request through the wireless interface 418. In yet another embodiment, the sensor 420 may trigger interrupts in the processor 402 upon the occurrence of certain environmental events, which interrupts may then cause the processor 402 to store data representative of such environmental events.

Description of an Exemplary Wireless Mobile Computing Device

Figure 5:
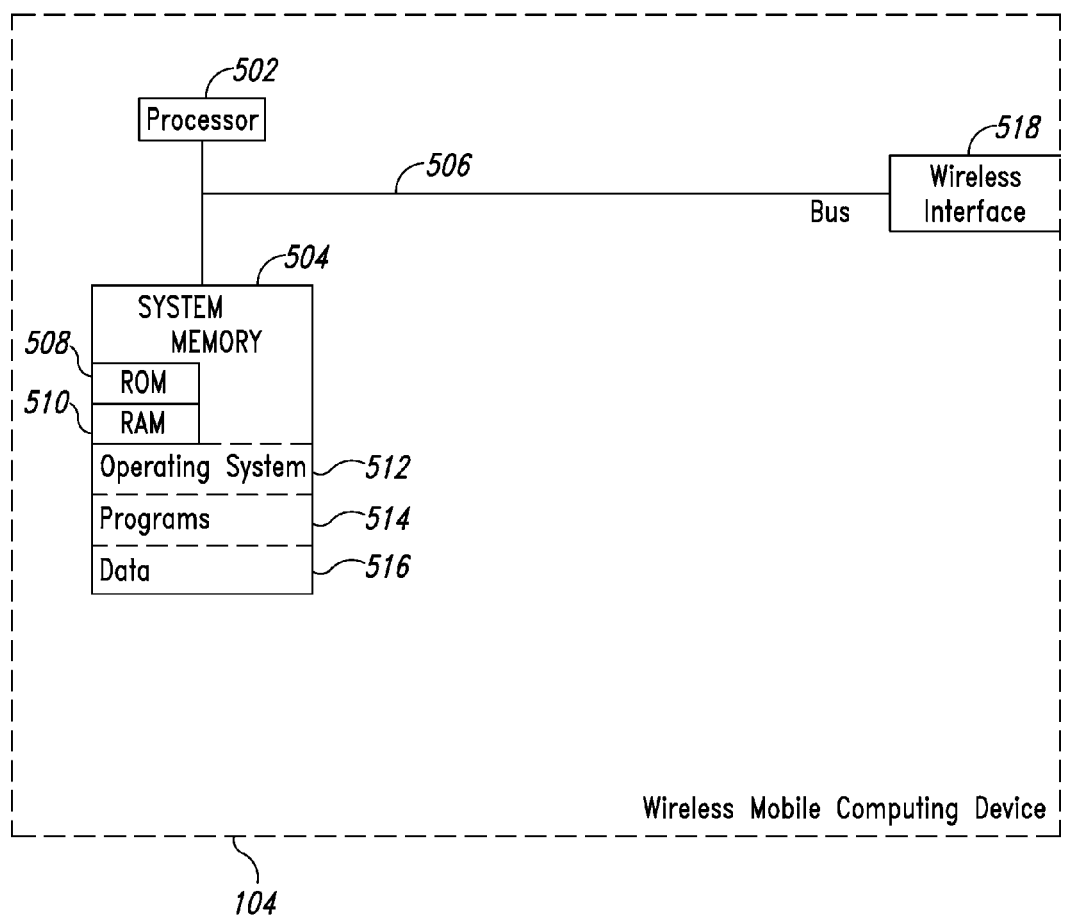
FIG. 5 is a schematic view of a wireless mobile computing device, according to one illustrated embodiment.

FIG. 5 is a schematic diagram of an exemplary wireless mobile computing device 104. Although not required, the embodiments will be described in the general context of computer-executable instructions, such as program modules, objects, or macros being executed by a processor. Those skilled in the relevant art will appreciate that the illustrated embodiments as well as other embodiments can be practiced with other wireless mobile computing device configurations, including handheld devices, personal digital assistants, cellphones, microprocessor-based or programmable consumer electronics, personal computers ("PCs"), and the like.

The wireless mobile computing device 104 may include a processor or other logic unit 502, a system memory 504 and a system bus 506 that couples various system components including the system memory 504 to the processor 502.

The processor 502 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 5 are of conventional design. As a result, such blocks need not be described in further detail herein, as they will be understood by those skilled in the relevant art.

The system bus 506 can employ any known bus structures or architectures, including a memory bus with memory controller, a peripheral bus, and a local bus. The system memory 504 may include read-only memory ("ROM") 508 and random access memory ("RAM") 510. The wireless mobile computing device 104 may also include a more permanent form of memory or other computer-readable media, such as flash memory, hard disk drives, smart cards, etc. (not shown). In one embodiment, the wireless mobile computing device may further include a display (not shown) to facilitate interaction with a user.

Program modules can be stored in the system memory 504, such as an operating system 512, one or more programs 514 and data 516 (program data, identifier data, etc.).

The wireless mobile computing device 104 may operate in a networked environment via a wireless interface 518 to communicate with one or more wireless devices. In one embodiment, the wireless interface 518 may function as a wireless interrogator for wireless communication. The wireless interface may transmit and receive wireless signals, in any of a variety of frequency ranges. In one embodiment, the operative range of the wireless mobile computing device 104 may be chosen to match the operative range of the wireless sensor nodes 102 in the network 100.

The operating system 512 and/or the programs 514 may formulate and send data requests to the network 100. Such data requests may request data relating to one or more environmental characteristics detected by sensors in the wireless sensor nodes 102. In some embodiments, the data requests may be generated and transmitted automatically by a program 514; however, in other embodiments, the data requests may be generated and transmitted based on user input. For example, a user may interact with the wireless mobile computing device 104 via one or more input devices (not shown) in order to request one or more types of data.

Figure 6:
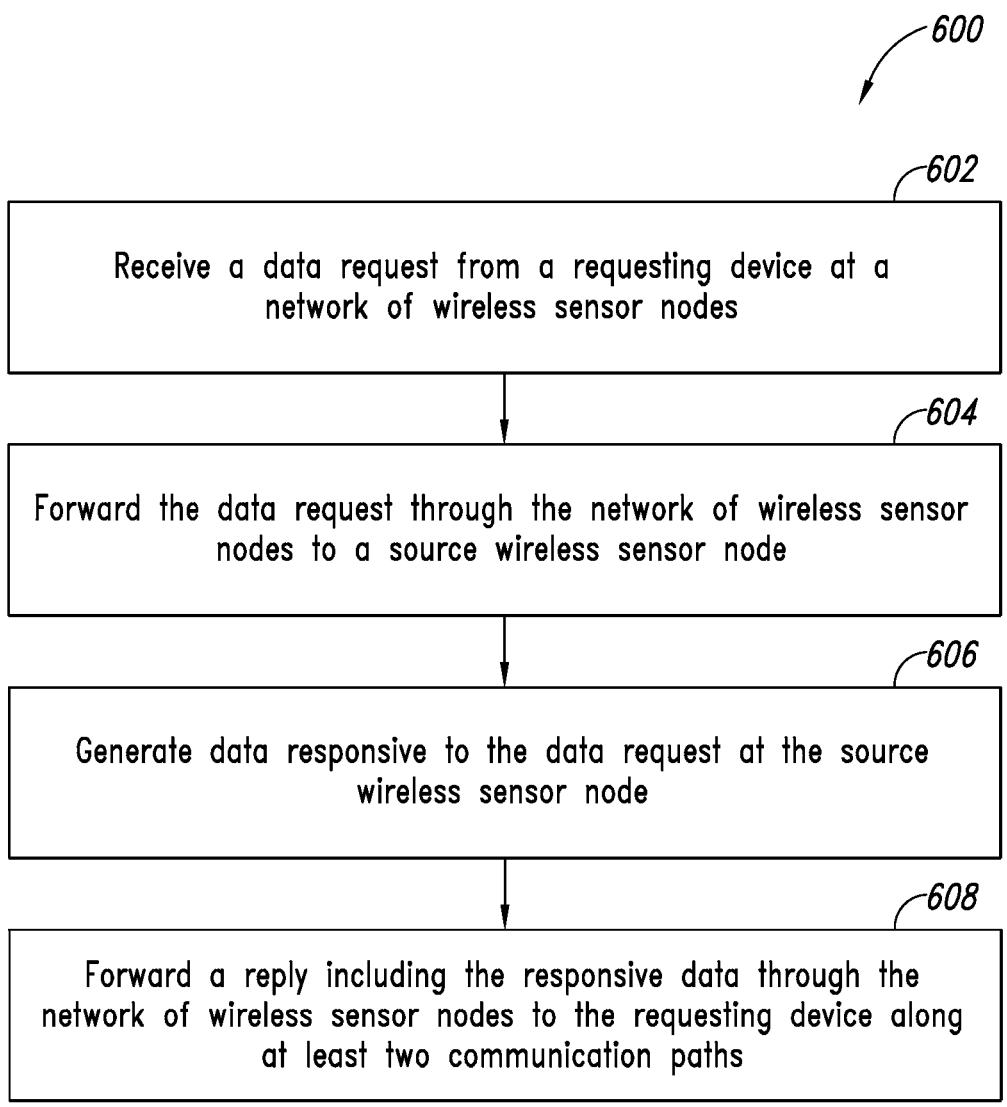
FIG. 6 is a flow diagram illustrating a method for collecting data from a network of wireless sensor nodes, according to one illustrated embodiment.

Description of an Exemplary Method for Collecting Data from a Network of Wireless Sensor Nodes FIG. 6 illustrates a flow diagram for a method 600 of collecting data from a network of wireless sensor nodes, according to one embodiment. This method 600 will be discussed in the context of the network 100 and wireless mobile computing device 104 of FIGS. 1-3B. However, it may be understood that the acts disclosed herein may also be executed using a variety of wireless sensor node networks, including any of those discussed above, in accordance with the described method.

The method begins at 602, when a data request from a requesting device is received at a network 100 of wireless sensor nodes 102. As illustrated above, the requesting device may, in one embodiment, be a wireless mobile computing device 104. However, in other embodiments, the requesting device may be a wireless sensor node 102 in the network 100, another stationary or mobile node in the network 100, or any other wireless device.

As discussed above, the data request may request any kind of data. In one embodiment, the data request may relate to the environmental characteristics detected at one or more sensors at the wireless sensor nodes 102. In another embodiment, the data request may relate to environmental characteristics that may be determined based upon the quality of the communications between the wireless sensor nodes 102. In yet another embodiment, the data request may relate to the condition of the wireless sensor nodes 102 (e.g., remaining power, signal strength, or firmware version).

The data request may be formatted and transmitted according to any of a variety of network protocols. For example, in one embodiment, the data request may be formatted according to 802.11x requirements, wireless USB specifications, RFID specifications, etc. In some embodiments, the data request may be formatted and transmitted without error-detection/error-correction schemes in order to conserve power. For example, error-correcting codes, data redundancy and other common methods for ensuring an accurate transmission may be omitted in favor of a shorter, less certain transmission.

In one embodiment, the data request may be directly transmitted by the requesting device accompanied by an identifier associated with the requesting device, a priority indication, and/or an attribute associated with the data request. The identifier associated with the requesting device may comprise a unique identifier associated with the requesting device during manufacturing, a network identifier generated during the requesting device's association with the network 100, or some other identifier. In one embodiment, shorter network identifiers may be used to minimize the length of the transmitted data. By including an identifier, the requesting device may help to ensure that it receives the replies intended for the requesting device. For example, if multiple requesting devices simultaneously make data requests, the identifier may be used to determine whether or not a particular response was intended for one or another requesting device.

The priority indication may be a simple bit flag indicating that the data request has a high or a low priority. In another embodiment, further gradations of priority may be included with the data request. The priority indication may be used in a variety of ways. For example, if multiple data requests are made to a network 100, wireless sensor nodes 102 may prioritize response to those data requests having a higher priority. In another embodiment, wireless sensor nodes 102 with relatively low battery power may not respond to or may ignore data requests having a low priority in order to conserve battery life.

Other attributes associated with the data request may also be sent. For example, the data request may target particular locations within the network 100, and an attribute may be sent along with the data request indicating which locations are of interest. In another embodiment, the attribute may include a timeout provision, such that if the data request does not reach a source wireless sensor node 102 within a certain period of time, then the data request should not continue to be forwarded. In yet another embodiment, the attribute may include a maximum forwarding provision, indicating a maximum number of nodes through which a data request may be forwarded.

In one embodiment, the data request may be encoded as an element from a lookup table. For example, both the wireless sensor nodes 102 and the requesting device may include identical lookup tables with codes corresponding to potential data requests. Thus, the code 001, for example, may correspond to a request for the identifiers of all wireless sensor nodes 102 having a current temperature exceeding 70° F. The wireless mobile computing device 104, or other requesting device, may then simply transmit the code 001 to the network 100. In one embodiment, this higher-level abstraction enables the network 100 to transmit and receive relatively short wireless messages, conserving energy expended by the wireless interfaces of the wireless sensor nodes 102. In another embodiment, the data request may also be formulated in a more generic coding language in order to formulate data requests not contemplated during the creation of the lookup table.

As the data request from the requesting device is received at one or more wireless sensor nodes 102, the wireless sensor nodes 102 may also associate with the requesting device and respond to the requesting device with their own network identifiers. In one embodiment, this method of association may be carried out by any of a number of network protocols.

However, it may also be carried out as described in co-pending U.S. patent application Ser. No. 11/848,121, filed concurrently, titled "SYSTEMS, METHODS, AND DEVICES THAT DYNAMICALLY ESTABLISH A SENSOR NETWORK."

At 604, the data request is forwarded through the network 100 of wireless sensor nodes 102 to a source wireless sensor node. This is schematically illustrated in FIGS. 2A and 3A, as the data request (represented by dashed lines) is forwarded from the wireless mobile computing device 104 to the source wireless sensor nodes 6 and 9.

In one embodiment, as each wireless sensor node 102 receives a copy of the data request, it is forwarded on to those wireless sensor nodes 102 with which that wireless sensor node 102 has direct communication. The wireless sensor nodes 102 may also add information to the forwarded data request, including: an identifier associated with the wireless sensor node 102, and a hop count corresponding to a number of direct transmissions associated with a communication path between the wireless sensor node 102 and the requesting device.

The identifier associated with the wireless sensor node 102 may comprise a unique identifier associated with the wireless sensor node 102 during manufacturing, a network identifier assigned or chosen during the wireless sensor node's association with the network 100, or any other identifier. As described above, shorter identifiers may be used to conserve energy during transmission.

In one embodiment, the hop count forwarded along with the data request may correspond to a minimum hop count between the forwarding wireless sensor node 102 and the requesting device. For example, as shown in FIG. 2A, wireless sensor node 5 might transmit a hop count of two to wireless sensor node 6, despite the fact that another communication path between wireless sensor node 5 and the wireless mobile computing device 104 (5, 3, 2, 0) has a greater hop count.

One method of determining the minimum hop count is described herein, although other ways are, of course, possible. Referring again to FIG. 2A, wireless sensor node 2 may receive an original copy of a data request directly from the wireless mobile computing device 104, and the wireless sensor node 2 may therefore determine that there is only one hop between it and the wireless mobile computing device 104. This determination may be made in a variety of ways. For example, the wireless sensor node 2 may detect that no hop count was sent with the initial data request, or that an included identifier does not match some characteristic of identifiers of the wireless sensor nodes 102. In another embodiment, the strength of the initial data request may be characteristic of a requesting device. Regardless of how this determination is made, the wireless sensor node 2 may then forward the data request to wireless sensor nodes 3, 5 and 8 along with a hop count of one.

As illustrated in FIG. 2A, wireless sensor node 3, in turn, may receive two data requests, one from wireless sensor node 1 and the other from wireless sensor node 2. Each of these data requests may be accompanied by a hop count of one. Since wireless sensor node 3 is, of course, one hop away from either of these two wireless sensor nodes 1 or 2, the communication paths back to the requesting device simply have the hop counts forwarded to the wireless sensor node 3 incremented by one. Thus, wireless sensor node 3 may forward the data request to the next wireless sensor nodes with an incremented hop count (two, in this example).

Wireless sensor node 5 may receive one data request from wireless sensor node 2 with a first hop count of one and another data request from wireless sensor node 3 with a second hop count of two. The wireless sensor node 5 may compare the first hop count with the second hop count. Since the first hop count is less than the second hop count, the wireless sensor node 5 may store the identifier of wireless sensor node 2 as the starting node for a preferred communication path back to the requesting device.

At 606, data responsive to the data request is generated at a source wireless sensor node. It may be understood that the data responsive to the data request may have been generated prior to the data request, as the data request is forwarded through the network 100, or after receipt of the data request at the source wireless sensor node.

As discussed above, the source wireless sensor node may include one or more sensors that detect environmental characteristics. The responsive data may be generated based at least in part on these detected environmental characteristics. For example, a temperature sensor may be configured to sense a temperature of the local environment of a wireless sensor node 102. If the data requested is, as in the example above, identifiers for those wireless sensor nodes 102 having temperatures exceeding 70° F., then the responsive data is based at least in part on the readings from such temperature sensors in addition to the identifiers of the source wireless sensor nodes.

At 608, a reply including the responsive data is forwarded through the network 100 of wireless sensor nodes 102 to the requesting device along at least two communication paths. As discussed above, by sending replies along at least two communication paths, the network 100 may incorporate data and transmission redundancy and may increase the likelihood that a successfully transmitted reply will be received by the wireless mobile computing device 104.

The reply, like the data request, may be formatted and transmitted according to any of a variety of network protocols. For example, in one embodiment, the reply may be formatted according to 802.11x requirements, wireless USB specifications, RFID specifications, etc. In some embodiments, the reply may be formatted and transmitted without error-detection/error-correction schemes in order to conserve power. For example, error-correcting codes, data redundancy and other common methods for ensuring an accurate transmission may be omitted in favor of a shorter, less certain transmission. In one embodiment, the reply may include not only the responsive data, but also an identifier of the source wireless sensor node and an identifier of the requesting device.

In one embodiment, the reply may be forwarded along communication paths associated with a minimum hop count between the source wireless sensor node 102 and the requesting device. As illustrated in FIGS. 2B and 3B, one or more communication paths from one or more of the wireless sensor nodes 102 to the wireless mobile computing device 104 may have the same minimum hop count value. In other embodiments, replies may be forwarded along multiple paths, even if one or more of the paths does not have a minimum hop count value. For example, in one embodiment, to increase redundancy, the wireless sensor nodes 102 may forward the data along every potential path between a source wireless sensor node 102 and the wireless mobile computing device 104.

In yet another embodiment, the source wireless sensor node and subsequent forwarding nodes may have information concerning the remaining battery life of adjacent wireless sensor nodes 102. This battery life information may be determined in a variety of ways (e.g., by the strength of a signal received by the wireless sensor nodes 102 during forwarding of the original data request, or by information forwarded with the original data request indicative of the remaining battery life). The wireless sensor nodes 102 may then choose communication paths for the replies that, if possible, include wireless sensor nodes with more battery life remaining, in order to increase the active lifetime of the network 100.

In one embodiment, each wireless sensor node 102, having received and forwarded the data request, may have stored thereon at least one identifier for an adjacent wireless sensor node corresponding to a preferred communication path back to the requesting device. For example, wireless sensor node 3, in FIG. 2A may store identifiers for both wireless sensor nodes 1 and 2 (as each is associated with a minimum hop count to the wireless mobile computing device 104). Meanwhile, wireless sensor node 5 may store an identifier corresponding to wireless sensor node 2, as it is associated with a minimum hop count to the wireless mobile computing device 104. Thus, when the replies are forwarded through the network 100 of wireless sensor nodes 102 back to the requesting device, each wireless sensor node 102 may forward the reply to the particular wireless sensor node associated with the corresponding stored identifier.

In another embodiment, each transmission between the wireless sensor nodes 102 may include data representative of a communication path back to the wireless mobile computing device 104, or other requesting device. For example, wireless sensor node 2 may forward to wireless sensor node 5 data representing the communication path (2, 0). Wireless sensor node 5 may, in turn, forward data representing the path (5, 2, 0). At least one of these communication paths may then be appended to each reply and may be traced back to the requesting device. In this embodiment, the wireless sensor nodes 102 need not keep the communication path in their memory; however, the amount of data transmitted may be increased.

Other embodiments, and other methodologies for creating and tracking communication paths between a source wireless sensor node 102 and a requesting device (such as the wireless mobile computing device 104) are also possible.

Figure 7:
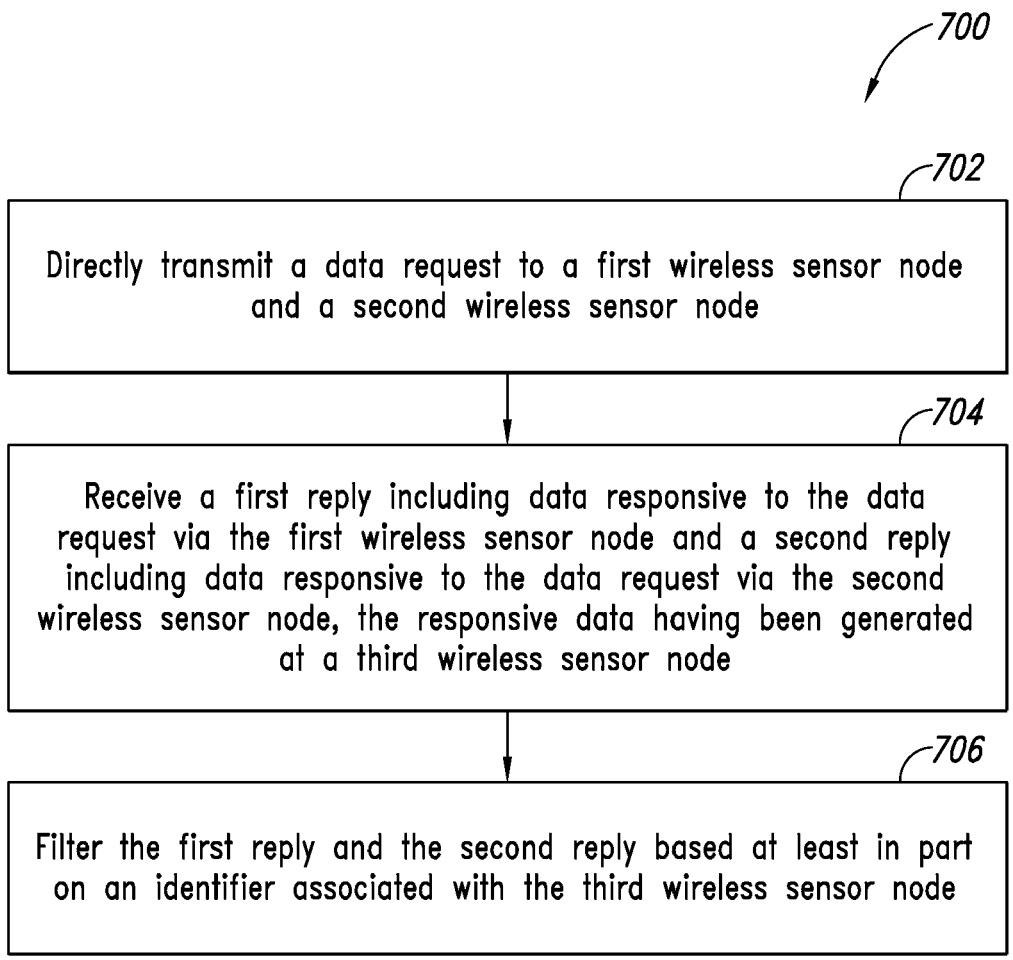
FIG. 7 is a flow diagram illustrating another method for collecting data from a network of wireless sensor nodes, according to one illustrated embodiment.

Description of an Exemplary Method for Collecting Data from a Network of Wireless Sensor Nodes FIG. 7 illustrates a flow diagram for another method 700 of collecting data from a network of wireless sensor nodes, according to one embodiment. This method 700 will be discussed in the context of the network 100 and wireless mobile computing device 104 of FIGS. 1-3B. As set forth below, in one embodiment, the wireless mobile computing device 104 may perform all of the acts in the method 700. However, in other embodiments, other nodes in the network 100 or other requesting devices may perform one or more of these acts. It may also be understood that the acts disclosed herein may be executed using a variety of wireless sensor node networks, including any of those discussed above, in accordance with the described method.

The method begins at 702, when a data request is directly transmitted to a first wireless sensor node and a second wireless sensor node. Such an embodiment is disclosed in FIG. 2A, in which a wireless mobile computing device 104 transmits a data request directly to wireless sensor nodes 1 and 2. The data request may be formatted and transmitted as described above in detail with respect to FIG. 6.

At 704, a first reply including data responsive to the data request is received via the first wireless sensor node, and a second reply including data responsive to the data request is received via the second wireless sensor node, the responsive data having been generated at a third wireless sensor node. In one embodiment, the third wireless sensor node does not directly receive the data request from the requesting device.

The first and second replies may be encoded to minimize transmission length in one embodiment. As described above, with reference to FIGS. 2B and 6, the first and second replies may include the responsive data, as well as an identifier associated with the third wireless sensor node.

At 706, based at least in part on the identifier associated with the third wireless sensor node, the first reply and the second reply may be filtered. In one embodiment, the replies may be filtered by discarding the responsive data from the first reply and storing the responsive data from the second reply for future processing. In another embodiment, the replies may be filtered by comparing the responsive data included with both replies to ensure that the responsive data matches, and then discarding the responsive data from one of the replies.

If a wireless mobile computing device 104 has completed the above acts, it may perform any of a variety of tasks based on the responsive data. For example, in one embodiment, the responsive data may be stored in a database or other computer-readable data structure for further processing. In another embodiment, the responsive data may be displayed to a user. In yet another embodiment, the responsive data may be compiled with responsive data from previous or later data requests and then presented to a user.

Figure 8:
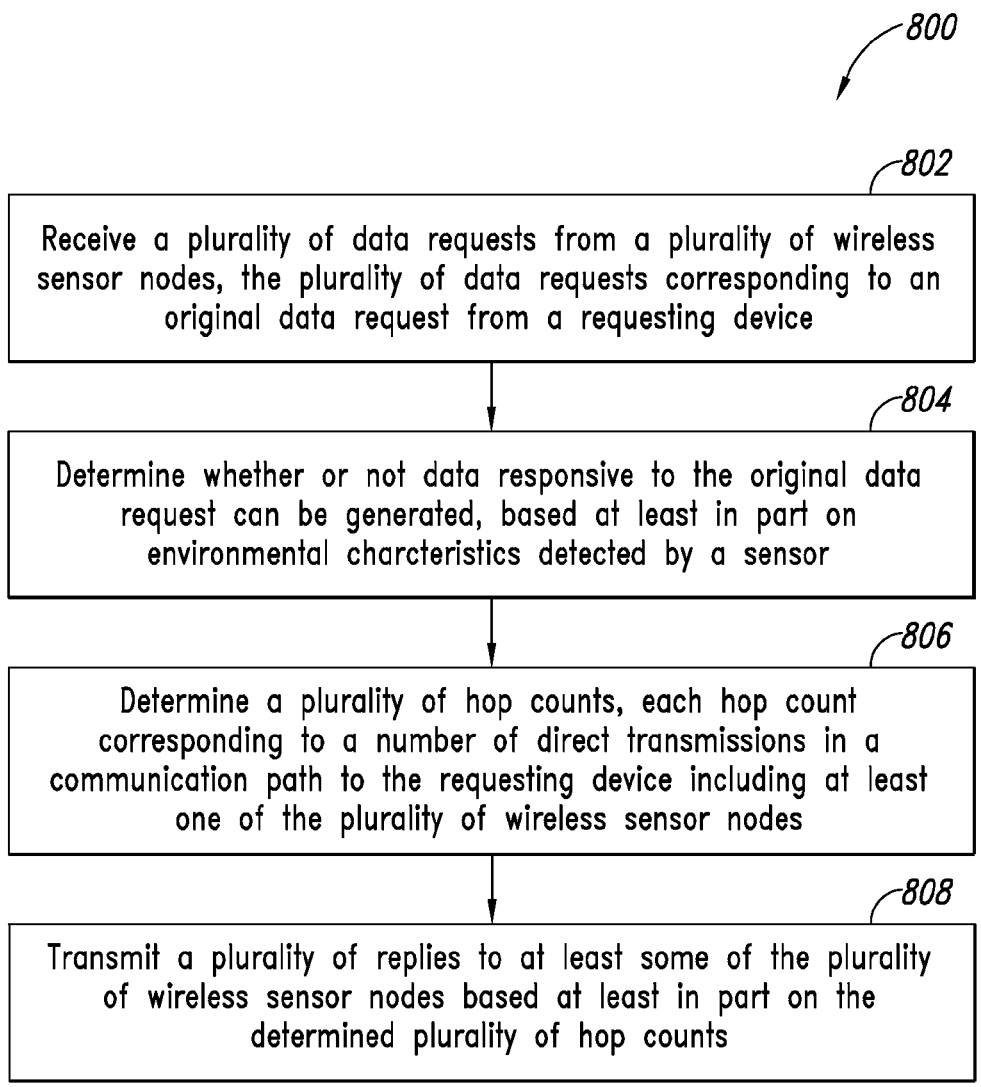
FIG. 8 is a flow diagram illustrating a method for collecting and transmitting data in a network of wireless sensor nodes, according to one illustrated embodiment.

Description of an Exemplary Method for Collecting and Transmitting Data at a Wireless Sensor Node in a Network of Wireless Sensor Nodes FIG. 8 illustrates a flow diagram for a method 800 for collecting and transmitting data at a wireless sensor node in a network of wireless sensor nodes. This method 800 will be discussed in the context of the network 100 and the wireless mobile computing device 104 of FIGS. 1-3B. As set forth below, in one embodiment, a single source wireless sensor node or other wireless sensor node 102 in the network 100 may perform all of the acts in the method 800. However, in other embodiments, a plurality of wireless sensor nodes may perform these acts in concert. It may also be understood that the acts disclosed herein may be executed using a variety of wireless sensor node networks, including any of those discussed above, in accordance with the described method.

The method begins at 802, when a plurality of data requests is received from a plurality of wireless sensor nodes 102, the plurality of data requests corresponding to an original data request from a requesting device. In one embodiment, as discussed above, the original data request may have been transmitted by a wireless mobile computing device 104, or other requesting device.

In one embodiment, the plurality of data requests is received at a wireless sensor node 102 in the network 100. The wireless sensor node 102 may recognize an identifier associated with the original data request indicating that the plurality of data requests correspond to the same original data request and may therefore respond to only one of the plurality of data requests. In other embodiments, the wireless sensor node 102 may respond to each of the plurality of data requests, despite the fact that they correspond to the same original data request.

At 804, it is determined whether or not data responsive to the original data request can be generated, based at least in part on environmental characteristics detected by a sensor. In one embodiment, a wireless sensor node 102 may execute a program that determines, based on the received data requests, whether or not a processor in the wireless sensor node 102 can generate the responsive data based on the environmental characteristics detected by an integrated sensor. As discussed in detail above, the data responsive to the original data request may be generated before, during, or after receipt of the plurality of data requests. In one embodiment, if it is determined that the responsive data can be generated, then the wireless sensor node 106 may generate the responsive data based at least in part on the detected environmental characteristics.

At 806, a plurality of hop counts is determined, each hop count corresponding to a number of direct transmissions in a communication path to the requesting device including at least one of the plurality of wireless sensor nodes. As discussed above, a wireless sensor node 102 may determine potential hop counts in communication paths between it and a requesting device in a variety of ways. For example, in one embodiment, a first wireless sensor node may forward its own minimum hop count to a second wireless sensor node. The second wireless sensor node may then simply add one to the received hop count to determine a hop count for a communication path back to the requesting device including the first wireless sensor node.

Finally, at 808, a plurality of replies may be transmitted to at least some of the plurality of wireless sensor nodes based at least in part on the determined plurality of hop counts. It may be understood that this plurality of replies may include the responsive data and might have been generated at any wireless sensor node 102 in the network 100. Indeed, as shown in FIG. 2B, a plurality of replies may be transmitted from a source wireless sensor node 6. In another embodiment, as shown in FIG. 3B, a plurality of replies may be transmitted from a forwarding wireless sensor node 5 between the source wireless sensor node 9 and the wireless mobile computing device 104.

As described above, the replies may be transmitted based at least in part on the determined plurality of hop counts. In one embodiment, replies may be transmitted only along communication paths associated with a minimum hop count value. In other embodiments, communication paths with low hop counts may be used, or all communication paths may be used.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any processor-related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

We claim:

1. A method for collecting data from a network of wireless sensor nodes, comprising:
    directly transmitting a data request from a requesting device to a first wireless sensor node and a second wireless sensor node;
    receiving at the requesting device a first reply including data responsive to the data request via the first wireless sensor node and a second reply including data responsive to the data request via the second wireless sensor node, the responsive data in the first reply and the responsive data in the second reply having been generated at a third wireless sensor node; and
    filtering the first reply and the second reply at the requesting device based at least in part on an identifier associated with the third wireless sensor node.

2. The method of claim 1, wherein directly transmitting the data request further includes directly transmitting the data request from a wireless mobile computing device.

3. The method of claim 2, wherein directly transmitting the data request further includes directly transmitting an identifier associated with the wireless mobile computing device, a priority indication, and an attribute associated with the data request.

4. The method of claim 1, wherein the first reply and the second reply further include the identifier associated with the third wireless sensor node.

5. The method of claim 1, wherein filtering the first reply and the second reply further includes discarding the responsive data from the first reply and storing the responsive data from the second reply.

6. A system for collecting data from a network of wireless sensor nodes, comprising:
    a wireless mobile computing device having:
        a mobile device processor that executes instructions; and
        a mobile device memory that stores instructions that cause the mobile device processor to:
            transmit a data request; and
            receive at least one reply including data responsive to the transmitted data request; and
    a source wireless sensor node having:
        a sensor that detects environmental characteristics;
        a sensor node processor that executes instructions; and
        a sensor node memory that stores instructions that cause the sensor node processor to:
            receive a plurality of forwarded data requests corresponding to the transmitted data request from a plurality of wireless sensor nodes;
            generate the responsive data based at least in part on the detected environmental characteristics;
            determine a plurality of hop counts, each hop count corresponding to a number of direct transmissions in a communication path between the source wireless sensor node and the wireless mobile computing device including at least one of the plurality of wireless sensor nodes;
            determine a minimum hop count value from among the determined plurality of hop counts; and
            transmit a plurality of replies including the responsive data based at least in part on the determined plurality of hop counts to at least some of the plurality of wireless sensor nodes associated with hop counts of the minimum hop count value.

7. The system of claim 6, wherein the sensor node memory stores further instructions that cause the sensor node processor to:
    determine the plurality of hop counts by receiving a previous hop count from at least one of the plurality of wireless sensor nodes.

8. The system of claim 6, wherein the sensor node memory stores further instructions that cause the sensor node processor to:
    compare at least one of the plurality of forwarded data requests with at least one code in a look-up table; and
    determine whether the sensor node processor can generate the responsive data based at least in part on the comparison.

9. A method for collecting data from a network of wireless sensor nodes, comprising:
    receiving a data request from a requesting device at a network of wireless sensor nodes;
    forwarding the data request through the network of wireless sensor nodes to a source wireless sensor node;
    generating data responsive to the data request at the source wireless sensor node; and
    forwarding a reply including the responsive data along at least two communication paths through the network of wireless sensor nodes to the requesting device, wherein each communication path extends from the source wireless sensor node to the requesting device, wherein forwarding the data request through the network of wireless sensor nodes further includes forwarding the data request from a first wireless sensor node to a second wireless sensor node with an identifier of the first wireless sensor node and a first hop count corresponding to a number of direct transmissions in a first communication path between the first wireless sensor node and the requesting device and forwarding the data request from a third wireless sensor node to the second wireless sensor node with an identifier of the third wireless sensor node and a third hop count corresponding to a number of direct transmissions in a third communication path between the third wireless sensor node and the requesting device.

10. The method of claim 9, wherein forwarding the data request through the network of wireless sensor nodes further includes:
    comparing the first hop count to the third hop count;
    if the first hop count is greater than the third hop count, storing the identifier of the third wireless sensor node at the second wireless sensor node; and forwarding the data request from the second wireless sensor node to a fourth wireless sensor node with an identifier of the second wireless sensor node and a second hop count equal to the third hop count incremented by one.

11. The method of claim 9, wherein forwarding the reply further includes:
determining a plurality of hop counts, each hop count corresponding to a number of direct transmissions in a communication path back to the requesting device; and
selecting communication paths between the source wireless sensor node and the requesting device having a minimum hop count value.

12. A wireless sensor node for collecting and transmitting data in a network of wireless sensor nodes, the wireless sensor node comprising:
a sensor that detects environmental characteristics;
a processor that executes instructions; and
a memory that stores instructions that cause the processor to:
receive a plurality of data requests from a plurality of wireless sensor nodes, the plurality of data requests corresponding to one original data request from a requesting device;
determine whether the processor can generate data responsive to the original data request based at least in part on the detected environmental characteristics;
determine a plurality of hop counts, each hop count corresponding to a number of direct transmissions in a communication path between the wireless sensor node and the requesting device including at least one of the plurality of wireless sensor nodes;
determine a minimum hop count value from among the determined plurality of hop counts; and
transmit a plurality of replies to at least some of the plurality of wireless sensor nodes based at least in part on the determined plurality of hop counts to the at least some of the plurality of wireless sensor nodes associated with hop counts of the minimum hop count value.

13. The wireless sensor node of claim 12, wherein the memory stores further instructions that cause the processor to:
determine the plurality of hop counts by receiving a previous hop count from at least one of the plurality of wireless sensor nodes.

14. The wireless sensor node of claim 12, wherein the memory stores further instructions that cause the processor to:
compare at least one of the plurality of data requests with at least one code in a look-up table; and
determine whether the processor can generate the responsive data based at least in part on the comparison.

15. The wireless sensor node of claim 12, wherein the plurality of replies include data generated based at least in part on the detected environmental characteristics.

16. A wireless mobile computing device for collecting data from a network of wireless sensor nodes, the wireless mobile computing device comprising:
a processor that executes instructions; and
a memory that stores instructions that cause the processor to:
directly transmit a data request to a first wireless sensor node;
receive a first reply including data responsive to the data request from the first wireless sensor node and a second reply including data responsive to the data request from a second wireless sensor node, the responsive data in the first reply and the responsive data in the second reply having been generated at a third wireless sensor node; and
filter the first reply and the second reply based on an identifier associated with the second wireless sensor node.

17. The wireless mobile computing device of claim 16, wherein the memory stores further instructions that cause the processor to directly transmit an identifier associated with the wireless mobile computing device, priority indication, and an attribute associated with the data request.

18. The wireless mobile computing device of claim 16, wherein the first reply and the second reply include the identifier associated with the third wireless sensor node.

19. The wireless mobile computing device of claim 16, wherein the memory stores further instructions that cause the processor to filter the first reply and the second reply by discarding the responsive data from the first reply and storing the responsive data from the second reply.

* * * * *